United States Patent
Wu et al.

(10) Patent No.: US 11,876,899 B2
(45) Date of Patent: Jan. 16, 2024

(54) RANDOM NUMBER GENERATOR AND METHOD OF GENERATING OUTPUT RANDOM NUMBER

(71) Applicant: PUFsecurity Corporation, Hsinchu County (TW)

(72) Inventors: Meng-Yi Wu, Hsinchu County (TW); Chi-Yi Shao, Hsinchu County (TW); Ching-Sung Yang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 506 days.

(21) Appl. No.: 16/935,212

(22) Filed: Jul. 22, 2020

(65) Prior Publication Data
US 2021/0026603 A1   Jan. 28, 2021

Related U.S. Application Data

(60) Provisional application No. 62/878,725, filed on Jul. 25, 2019.

(51) Int. Cl.
*H04L 9/32* (2006.01)
*G06F 7/58* (2006.01)
(Continued)

(52) U.S. Cl.
CPC ........... *H04L 9/0869* (2013.01); *G06F 7/588* (2013.01); *H04L 9/06* (2013.01); *H04L 9/085* (2013.01);
(Continued)

(58) Field of Classification Search
CPC ... G06F 7/58–588; H04L 9/0869; H04L 9/06; H04L 9/0841; H04L 9/085; H04L 9/0894; H04L 9/3278; H04L 9/0618
See application file for complete search history.

(56) References Cited

U.S. PATENT DOCUMENTS 10,140,095 B2   11/2018   Dale
10,140,096 B1   11/2018   Diamant
(Continued)

FOREIGN PATENT DOCUMENTS

CN   101097510 A   1/2008
CN   108681442 A   10/2018
(Continued)

OTHER PUBLICATIONS

M. S. Hashemian, "A robust authentication methodology using physically unclonable functions in DRAM arrays," 2015 Design, Automation & Test in Europe Conference & Exhibition (DATE), Grenoble, France, 2015, pp. 647-652, doi: 10.7873/DATE.2015.03 (Year: 2015).*

(Continued)

*Primary Examiner* — Jyoti Mehta
*Assistant Examiner* — Huy Duong
(74) *Attorney, Agent, or Firm* — Winston Hsu

(57) ABSTRACT

A random number generator includes a static random number generator, a dynamic entropy source, a counter and a combining circuit. The static random number generator includes an initial random number pool and a static random number pool to output a static random number sequence from one thereof the initial random number pool and the static random number pool. The dynamic entropy source is used to generate a dynamic entropy bit. The counter is used to generate a dynamic random number sequence according to the dynamic entropy bit. The combining circuit is used to output a true random number sequence to a lively random number pool according to the static random number sequence and the dynamic random number sequence. The static random number pool is updated when the lively random number pool is fully updated.

20 Claims, 7 Drawing Sheets

(51) Int. Cl.
*H04L 9/08* (2006.01)
*H04L 9/06* (2006.01)

(52) U.S. Cl.
CPC .......... *H04L 9/0841* (2013.01); *H04L 9/0894* (2013.01); *H04L 9/3278* (2013.01)

(56) References Cited

U.S. PATENT DOCUMENTS

| | | | |
|---|---|---|---|
| 11,010,137 B2 | 5/2021 | Wang | |
| 2005/0055391 A1* | 3/2005 | Carlson | G06F 7/588 708/250 |
| 2006/0104443 A1 | 5/2006 | Chari | |
| 2014/0219450 A1* | 8/2014 | Huang | H04L 9/0869 380/270 |
| 2016/0179472 A1* | 6/2016 | Sugahara | G06F 7/588 708/250 |
| 2018/0123808 A1* | 5/2018 | Hung | H04L 9/0866 |
| 2018/0314493 A1 | 11/2018 | Takahashi | |
| 2019/0324725 A1 | 10/2019 | Wang | |
| 2019/0386820 A1* | 12/2019 | Hars | H04L 9/0662 |
| 2020/0371752 A1* | 11/2020 | Murray | H04L 9/0869 |

FOREIGN PATENT DOCUMENTS

| | | | | |
|---|---|---|---|---|
| CN | 109478132 A | 3/2019 | | |
| CN | 109508174 A | 3/2019 | | |
| EP | 1840731 A2 * | 10/2007 | ............ | G06F 7/582 |
| JP | 2-93930 A | 4/1990 | | |
| JP | 2000-66879 A | 3/2000 | | |
| JP | 2000-206472 A | 7/2000 | | |
| JP | 2000-259395 A | 9/2000 | | |
| JP | 2001-43069 A | 2/2001 | | |
| JP | 2014-75082 A | 4/2014 | | |
| JP | 2014-102768 A | 6/2014 | | |
| JP | 2019-121403 A | 7/2019 | | |
| TW | 200414026 | 8/2004 | | |
| TW | 200414027 A | 8/2004 | | |
| TW | 200504586 | 2/2005 | | |
| TW | 200629192 | 8/2006 | | |
| TW | 200725389 | 7/2007 | | |
| TW | 200844463 | 11/2008 | | |
| TW | 200915175 | 4/2009 | | |
| TW | 200923769 | 6/2009 | | |
| TW | 201430699 A | 8/2014 | | |
| TW | 201721407 A | 6/2017 | | |
| TW | 201826162 A | 7/2018 | | |

OTHER PUBLICATIONS

Lingyan Fan, Liangliang Zhu, Jianjun Luo, Lichun Fang, Hailuan Liu; A true random number generator based on metastable state, Microelectronics, vol. 47, No. 4, p. 519-522, p. 527, Aug. 20, 2017.

* cited by examiner

RANDOM NUMBER GENERATOR AND METHOD OF GENERATING OUTPUT RANDOM NUMBER

CROSS REFERENCE TO RELATED APPLICATIONS

This non-provisional application claims priority of U.S. Provisional Patent Application No. 62/878,725, filed on 25 Jul. 2019, included herein by reference in its entirety.

BACKGROUND OF THE INVENTION

1. Field of the Invention

The disclosure relates to random number generation, and in particular, to a random number generator and a method of generating an output random number.

2. Description of the Prior Art

Random numbers are widely used in the fields of information security and statistical sampling. Random number generation is generation of a sequence of unpredicted and independent numbers conforming to a specified distribution. A pseudo-random number generator generates the sequence of numbers using a seed. An insufficient random seed may result in an insufficient random sequence, leading to insecure cryptographic systems or inaccurate sampling results.

SUMMARY OF THE INVENTION

According to an embodiment of the invention, a random number generator includes a static random number generator, at least one dynamic entropy source, a counter and a combining circuit. The static random number generator includes an initial random number pool and a static random number pool, and is used to output a static random number sequence from one of the initial random number pool and the static random number pool. The at least one dynamic entropy source is used to generate a dynamic entropy bit. The counter is coupled to the at least one dynamic entropy source and used to generate a dynamic random number sequence according to the dynamic entropy bit. The combining circuit is coupled to the static random number generator and the counter, and is used to receive the static random number sequence, and output a true random number sequence to a lively random number pool according to the static random number sequence and the dynamic random number sequence. The static random number pool is updated when the lively random number pool is fully updated.

According to another embodiment of the invention, a method of generating an output random number including: during an initialization phase, generating an initial static random number sequence from an initial random number pool, generating an initial true random number sequence according to the initial static random number sequence and an initial dynamic random number sequence, and initiating the static random number pool according to the initial true random number sequence; and during an operation phase, outputting the output random number, generating a subsequent static random number sequence from the static random number pool, generating a subsequent true random number sequence according to the subsequent static random number sequence and a subsequent dynamic random number sequence, and updating the static random number pool according to the subsequent true random number sequence.

These and other objectives of the present invention will no doubt become obvious to those of ordinary skill in the art after reading the following detailed description of the preferred embodiment that is illustrated in the various figures and drawings.

DETAILED DESCRIPTION

As used herein, the term "truly random" or "true random" refers to a bit stream or a data sequence that is substantially 50% in a hamming weight and an inter-device (ID) hamming distance, and is substantially 1 in a minimum entropy (min-entropy). The hamming weight measures an expected value of non-zero symbols in the bit stream in a percentage form. The ID hamming distance measures a hamming distance between two static entropy bit streams produced by two static entropy sources in response to an identical challenge. The min-entropy is a lower bound of entropy of the bit stream, measuring unpredictability of the bit stream.

Figure 1:
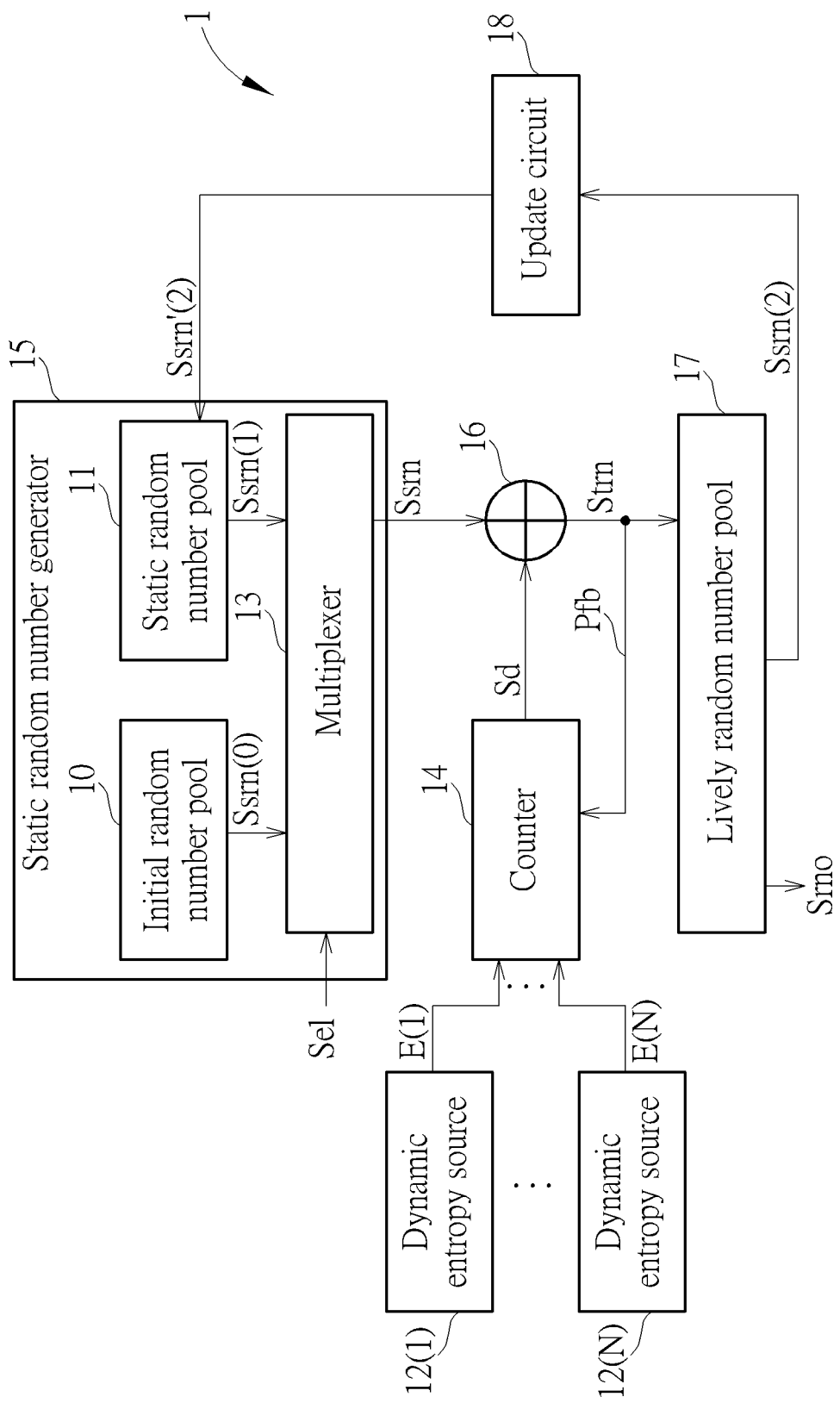
FIG. 1 is a block diagram of a random number generator according to an embodiment of the invention.

FIG. 1 is a block diagram of a random number generator 1 according to an embodiment of the invention. The random number generator 1 may initially update a lively random number pool according to data from an initial random number pool, and then update a static random number pool according to data from the lively random number pool on a continuous and iterative basis. Further, the random number generator 1 may extract an output random number Srno from the lively random number pool upon request of an external circuit, e.g., a deterministic random bit generator or a cryptographic system. The initial random number pool may contain fixed data for all devices employing the random number generator 1. The devices may be field programmable gate arrays (FPGA). The static random number pool may be constantly changing and unique to all the devices.

The random number generator 1 may include a static random number generator 15, dynamic entropy sources 12(1) to 12(N), a counter 14, a combining circuit 16, a lively random number pool 17 and an update circuit 18, N being a positive integer. The static random number generator 15 may include an initial random number pool 10, a static random number pool 11 and a multiplexer 13. The dynamic entropy sources 12(1) to 12(N) may be coupled to the counter 14. The initial random number pool 10 and the static random number pool 11 may be coupled to the multiplexer 13. The multiplexer 13 and the counter 14 may be coupled to the combining circuit 16. The combining circuit 16 may be coupled to the lively random number pool 17. The update circuit 18 is coupled to the lively random number pool 17 and the static random number pool 11. While a plurality of dynamic entropy sources 12(1) to 12(N) are used in the embodiment, adopting only one dynamic entropy source 12(1) in the random number generator 1 is also within the scope of the invention.

The random number generator 1 may operate in an initialization phase and an operation phase. During the initialization phase, the initial random number pool 10 may generate an initial static random number sequence Ssrn(0), the multiplexer 13 may select the initial static random number sequence Ssrn(0) from the initial random number pool 10 as the static random number sequence Ssrn according to a selection signal Sel. The initialization phase may be adopted upon power-up or activation of the random number generator 1. The selection signal Sel may be generated from an external control circuit. During the operation phase, the static random number pool 11 may generate a subsequent static random number sequence Ssrn(1), the multiplexer 13 may select according to the selection signal Sel the subsequent random number sequence Ssrn(1) from the static random number pool 11 as the static random number sequence Ssrn. The operation phase may be adopted upon initiation or update of the static random number pool 11. While the multiplexer 13 is adopted in the embodiment to select between data from the initial random number pool 10 and data form the static random number pool 11, it is also within the scope of the invention that the multiplexer 13 is eliminated from the random number generator 1, and instead a selection circuit may be included to enable one of the initial random number pool 10 and the static random number pool 11 according to an appropriate timing, so as to output the static random number sequence Ssrn therefrom.

The initial random number pool 10 may be a physically unclonable function (PUF) cell array, a non-volatile memory, a volatile memory or a fixed logic circuit containing a plurality of static entropy bits. The plurality of static entropy bits may be independent and identically distributed random variables (IID). The initial static random number sequence Ssrn(0) may have a predetermined data length, e.g., 32-bit. For example, the initial random number pool 10 may be 32-bit-by-32-bit one-time programmable (OTP) memory cells, and each row, column or diagonal line of the memory cells may contain truly random entropy bits. The OTP memory cells may be antifuse-based and the truly random entropy bits may be programmed into the OTP memory cells during manufacturing setup. When the initial random number pool 10 is a volatile memory such as a static random access memory (SRAM) or a register bank, the truly random entropy bits may be programmed into the initial random number pool 10 upon receiving requests for generating the initial static random number sequence Ssrn(0). The truly random entropy bits may be fixed in values and identical to all devices employing the random number generator 1. The initial random number pool 10 may output the initial static random number sequence Ssrn(0) according to a predetermined selecting algorithm. For example, the initial random number pool 10 may select 32-bit entropy bits from rows of memory cells in a predetermined row order to serve as the initial static random number sequence Ssrn(0). In some embodiments, the initial random number pool 10 may be a deterministic random bit generator (DRBG) generating a set of initial random numbers upon power-up or activation.

The static random number pool 11 may be a register bank and may have a size equal to or different from that of the initial random number pool 10. In some embodiments, both the static random number pool 11 and the initial random number pool 10 may be 1 k bits in size.

The dynamic entropy sources 12(1) to 12(N) may generate dynamic entropy bits E(1) to E(N), respectively and in real time. The dynamic entropy bits E(1) to E(N) may each be 1 bit in length.

The counter 14 may generate a dynamic random number sequence Sd according to at least one of the dynamic entropy bits E(1) to E(N). The counter 14 may be a linear feedback shift register (LFSR) or a digital counter, e.g., a 32-bit LFSR. The dynamic random number sequence Sd may have a data length equal to that of the static random number sequence Ssrn, e.g., 32-bit. During the initialization phase, the counter 14 may generate an initial dynamic random number sequence Sd, and during the operation phase, the counter 14 may generate a subsequent dynamic random number sequence Sd. In some embodiments, the counter 14 may be seeded by a seed sequence generated by the initial random number pool 10 upon power-up or activation, and the seed sequence may be 32-bit in length. In other embodiments, the counter 14 may be initialized by a fixed seed sequence upon power-up or activation, and the fixed seed sequence may be 32-bit in length. The counter 14 may receive the dynamic entropy bits E(1) to E(N) from the dynamic entropy sources 12(1) to 12(N), receive a predetermined bit in the true random number sequence Strn from the combining circuit 16 via a feedback path Pfb, combine the dynamic entropy bits E(1) to E(N) and the predetermined bit in the true random number sequence Strn to generate a reseeding control bit, and control reseeding of the counter 14 according to the reseeding control bit. For example, the counter 14 may perform an XOR operation on the dynamic entropy bits E(1) to E(N) and the predetermined bit in the true random number sequence Strn to generate the reseeding control bit. When the reseeding control bit is a logic level "0", the counter 14 may proceed counting, and when the reseeding control bit is a logic level "1", the counter 14 may be reseeded by a new seed sequence. In some embodiments, the new seed sequence may be generated by the initial random number pool 10. In other embodiments, the new seed sequence may be provided by an output data sequence of the combining circuit 16. As the result, the counter 14 may be reseeded in a random manner. In some embodiments, the counter 14 may employ a portion of the dynamic entropy bits E(1) to E(N) to generate the reseeding control bit.

The combining circuit 16 may combine the static random number sequence Ssrn and the dynamic random number sequence Sd in a bitwise manner to generate a true random number sequence Strn. The combining circuit 16 may be an XOR gate or a processor employing a data encryption standard (DES) algorithm, an advanced encryption standard (AES) algorithm or a hash function. For example, the combining circuit 16 may combine the 32-bit static random number sequence Ssrn and the 32-bit dynamic random number sequence Sd in a bitwise manner to generate a 32-bit true random number sequence Strn. Since combining a truly random number with a random number may produce a truly random number, and the static random number sequence Ssrn is truly random, the true random number sequence Strn may be truly random regardless of the dynamic random number sequence Sd being truly random or not. In addition, the dynamic random number sequence Sd may be used to randomize the static random number sequence Ssrn to generate the true random number sequence Strn unique to the device.

During the initialization phase, the static random number sequence Ssrn may be the initial static random number sequence Ssrn(0), and the combining circuit 16 may generate an initial true random number sequence Strn by combining the initial static random number sequence Ssrn(0) and the initial dynamic random number sequence Sd. During the operation phase, the static random number sequence Ssrn may be the subsequent static random number sequence Ssrn(1), and the combining circuit 16 may generate a subsequent true random number sequence Strn by combining the subsequent static random number sequence Ssrn(1) and the subsequent dynamic random number sequence Sd.

The lively random number pool 17 may be updated according to the true random number sequence Strn. During the initialization phase, the lively random number pool 17 may be updated according to the initial true random number sequence Strn. During the operation phase, the lively random number pool 17 may be updated according to the subsequent true random number sequence Strn, and may output an output random number Srno upon request, thereby enhancing data security. The lively random number pool 17 may sequentially receive a plurality of true random number sequences Strn from the combining circuit 16 and store the same until it is fully updated. In some embodiments, the lively random number pool 17 is fully updated when a quantity of random numbers in the lively random number pool 17 reaches a target quantity, e.g., 1 k bits. In other embodiments, the lively random number pool 17 is fully updated when a time period of updating the lively random number pool 17 reaches a target time period, e.g., 32 clock cycles. The lively random number pool 17 may be a register bank and may have a size equal to or different from that of the initial random number pool 10. In some embodiments, both the lively random number pool 17 and the initial random number pool 10 may be 1 k bits in size.

When the lively random number pool 17 is fully updated, the update circuit 18 may update the random numbers Ssrn(2) from the lively random number pool 17 to the static random number pool 11. In some embodiments, the update circuit 18 may directly forward the random numbers Ssrn(2) from the lively random number pool 17 to replace the data in the static random number pool 11. In other embodiments, the update circuit 18 may apply a compression and a nonlinear function to the random numbers Ssrn(2) from the lively random number pool 17 to generate updated true random numbers Ssrn'(2), and update the updated true random numbers Ssrn'(2) into the static random number pool 11. The compression may be a cryptographic hash function such as an MD5 algorithm, an SHA1 algorithm, an SHA2 algorithm and/or an SHA3 algorithm. The nonlinear function may be a substitution-box (S-box) and/or a block cipher. In this manner, the static random number pool 11 may be constantly updated. For example, the static random number pool 11 may be updated each time the lively random number pool 17 is fully updated.

When a device adopting the random number generator 1 enters a sleep mode or a low-power mode, the random numbers in the static random number pool 11 may be transmitted to a non-volatile memory for storage. Later when the device returns to a normal operation mode, the static random number pool 11 may restore the random numbers from the non-volatile memory to continue the operation.

The random number generator 1 generates in the initialization phase a unique set of truly random numbers in the static random number pool 11 from a fixed set of truly random numbers in the initial random number pool 10 via the lively random number pool 17, and continues in the operation phase to generate a new set of truly random numbers using the random numbers from the static random number pool 11, and update the new set of truly random numbers into the static random number pool 11 via the lively random number pool 17, while outputting the output random number Srno from the via the lively random number pool 17, saving random number resources while enhancing data security.

Figure 2:
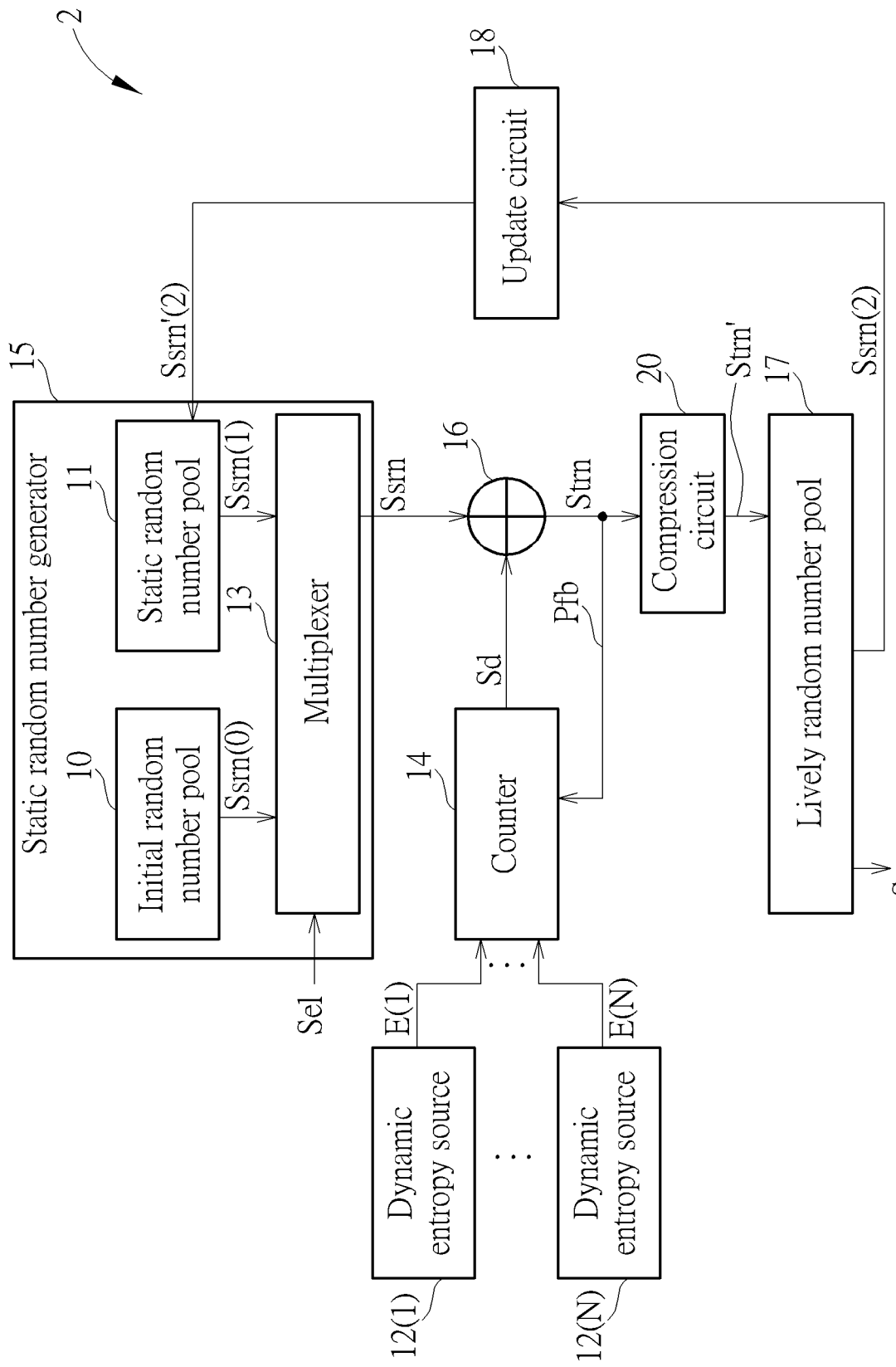
FIG. 2 is a block diagram of a random number generator according to another embodiment of the invention.

FIG. 2 is a block diagram of a random number generator 2 according to another embodiment of the invention. The random number generator 2 is different from the random number generator 1 in that a compression circuit 20 is further included. The following discussion will focus on the difference.

The compression circuit 20 may be coupled between the combining circuit 16 and the lively random number pool 17. The compression circuit 20 may compress the true random number sequence Strn into a compressed true random number sequence Strn', further enhancing data security. The compression circuit 20 may include an XOR gate. In some embodiments, the compression circuit 20 may include 8 4-input XOR gates compressing a 32-bit true random number sequence Strn into an 8-bit compressed true random number sequence Strn'. In other embodiments, the compression circuit 20 may include a 128-bit buffer and 32 4-input XOR gates coupled thereto. The 128-bit buffer may store 4 32-bit true random number sequences Strn sequentially in a buffering duration of 4 clock cycles. After the 4 32-bit true random number sequences Strn are buffered, each of the 32 4-input XOR gates may compress 4 corresponding bits of the 4 32-bit true random number sequences Strn into 1 corresponding bit in the compressed true random number sequence Strn', thereby generating a 32-bit compressed true random number sequence Strn'. The compressed true random number sequence Strn' is then transmitted to the lively random number pool 17 to update the same. While a particular quantity and type of the XOR gate are used in the embodiment, other quantities and/or types of the XOR gate may be used to implement the compression circuit 20, e.g., 4 8-input XOR gates may be used. Likewise, other sizes and buffering durations of the buffer may be adopted to meet the design requirements.

In comparison to the random number generator 1, the random number generator 2 employs the compression circuit 20 to increase data security.

Figure 3:
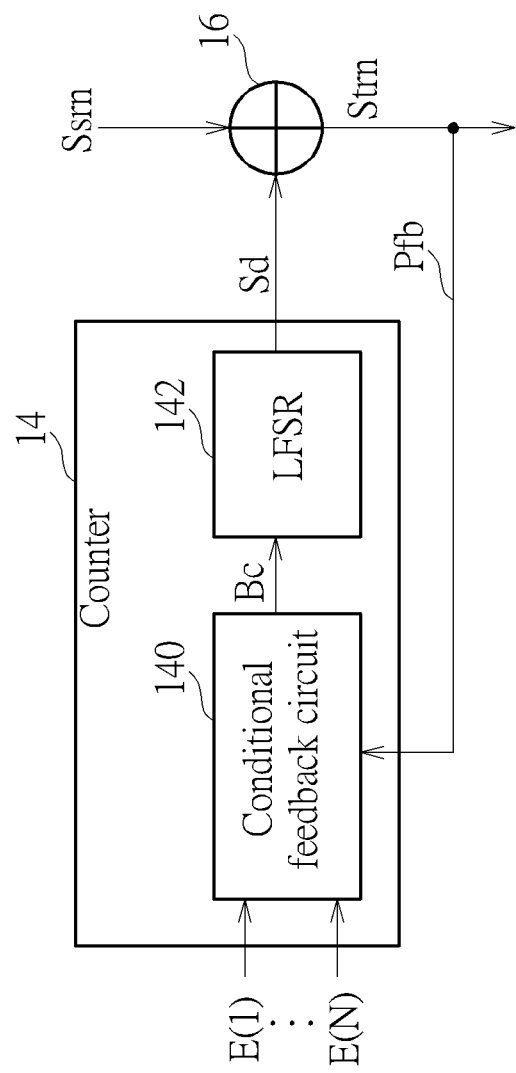
FIG. 3 shows a block diagram of the counter in FIGS. 1 and 2.

FIG. 3 shows a block diagram of the counter 14 for use in the random number generators 1 and 2. The counter 14 may include a conditional feedback circuit 140 and a linear feedback shift register (LFSR) 142. The conditional feedback circuit 140 may be coupled to the dynamic entropy sources 12(1) to 12(N) and the combining circuit 16. The LFSR 142 may be coupled between the conditional feedback circuit 140 and the combining circuit 16.

The conditional feedback circuit 140 may receive an ith true random number sequence Strn from the combining circuit 16 via the feedback path Pfb, and generate the reseeding control bit Bc according to the ith dynamic entropy bits E(1) to E(N) and the predetermined bit of the true random number sequence Strn. The conditional feedback circuit 140 may include an XOR gate to perform the XOR operation on the ith dynamic entropy bits E(1) to E(N) and the predetermined bit, so as to generate the reseeding control bit Bc. The LFSR 142 may be reseeded according to the reseeding control bit Bc to generate an ith dynamic random number sequence Sd. The conditional feedback circuit 140 may generate the reseeding control bit Bc upon an update of the dynamic entropy bits E(1) to E(N) or the predetermined bit of the true random number sequence Strn. That is, the reseeding control bit Bc may be updated each clock cycle, and the LFSR 142 may be reseeded each clock cycle depending on the value of the reseeding control bit Bc.

Figure 4:
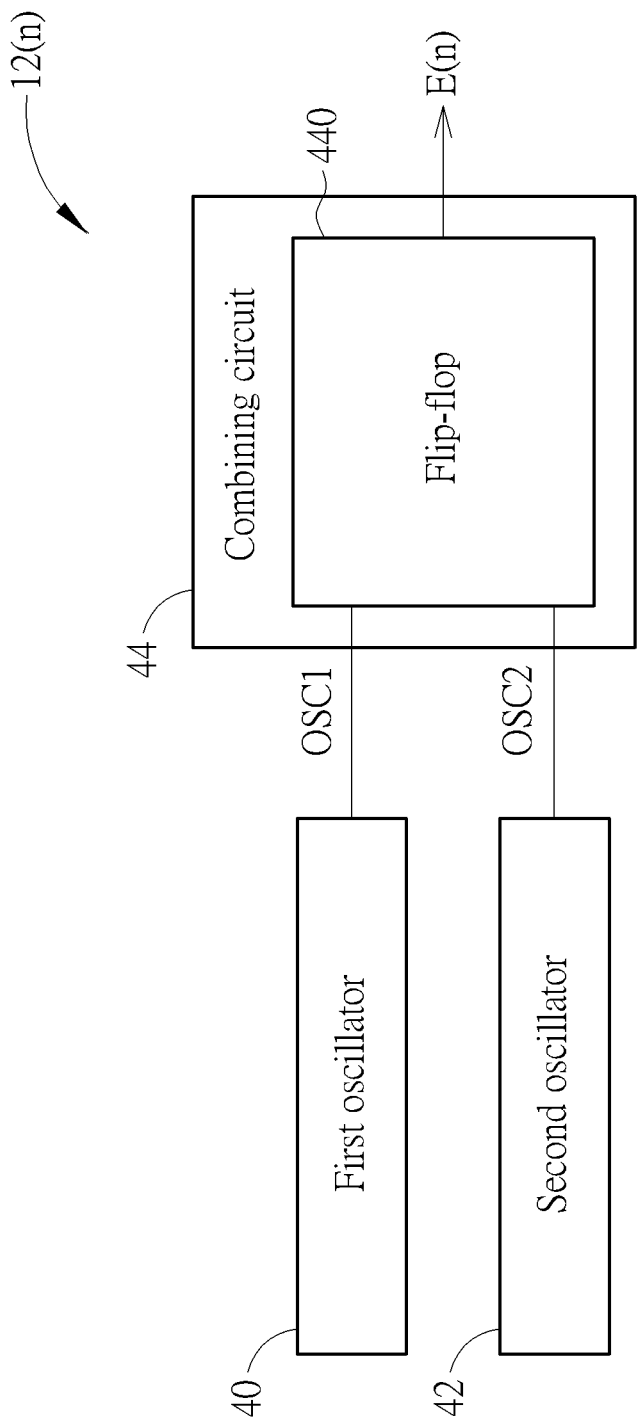
FIG. 4 is a block diagram of an exemplary dynamic entropy source in FIGS. 1 and 2.

FIG. 4 is a block diagram of an exemplary dynamic entropy source 12(*n*) in FIGS. 1 and 2, n is a positive integer ranging between 1 and N. The dynamic entropy source 12(*n*) may include a first oscillator 40, a second oscillator 42 and a combining circuit 44. The combining circuit 44 may include a flip-flop 440. The first oscillator 40 and the second oscillator 42 may be coupled to the flip-flop 440.

The first oscillator 40 may generate a first oscillation signal OSC1 oscillating in a first frequency. The second oscillator 42 may generate a second oscillation signal OSC2 oscillating in a second frequency. The combining circuit 44 may combine the first oscillation signal OSC1 and the second oscillation signal OSC2 to generate an dynamic entropy bit E(n). The first oscillator 40 and the second oscillator 42 may be ring oscillators.

In some embodiments, the flip-flop 440 may sample the first oscillation signal OSC1 using the second oscillation signal OSC2, so as to generate the dynamic entropy bit E(n). In some embodiments, the first frequency and the second frequency are different, and each of the first frequency and the second frequency may be a multiple of a prime number, misaligning level transitions of the first oscillation signal OSC1 and the second oscillation signal OSC2. For example, the first frequency may be 3 MHz and the second frequency may be 5 MHz. Since one prime number multiple may not be fully divided by another prime number multiple, the flip-flop 440 may sequentially generate the dynamic entropy bit E(n). In other embodiments, the first frequency and the second frequency are substantially equal, e.g., the first frequency and the second frequency may both be 3 MHz. Since the devices, the routing and the voltage and operating temperature environment of the first oscillator 40 and the second oscillator 42 may not be fully identical, the first oscillation signal OSC1 and the second oscillation signal OSC2 may continuously race with each other to arrive the flip-flop 440, thereby sequentially generating an arbitrary logic level "0" or logic level "1" as the dynamic entropy bit E(n).

Figure 5:
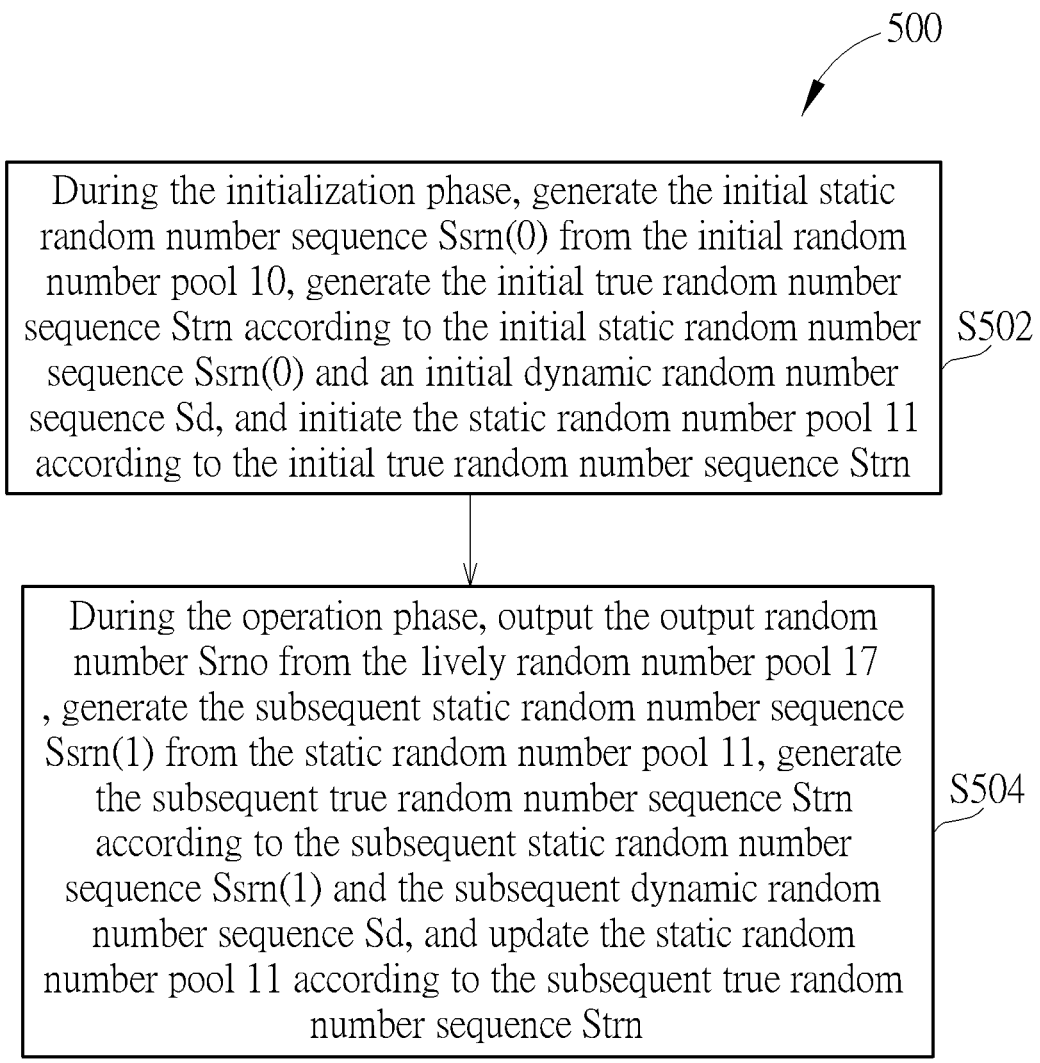
FIG. 5 is a flowchart of a method of generating an output random number for the random number generator in FIGS. 1 and 2.

FIG. 5 is a flowchart of a method 500 of generating the output random number Srno for use in the random number generators 1 and 2. The method 500 includes Steps S502 and S504 for generating the output random number Srno. Step S502 is used to update the lively random number pool 17 using the fixed and truly random numbers in the initial random number pool 10. Step S504 is used to generate the output random number Srno and to constantly update the static random number pool 11. Any reasonable step change or adjustment is within the scope of the disclosure. Steps S502 and S504 are explained as follows:

Step S502: During the initialization phase, generate the initial static random number sequence Ssrn(0) from the initial random number pool 10, generate the initial true random number sequence Strn according to the initial static random number sequence Ssrn(0) and the initial dynamic random number sequence Sd, and initiate the static random number pool 11 according to the initial true random number sequence Strn;

Step S504: During the operation phase, output the output random number Srno from the lively random number pool 17, generate the subsequent static random number sequence Ssrn(1) from the static random number pool 11, generate the subsequent true random number sequence Strn according to the subsequent static random number sequence Ssrn(1) and the subsequent dynamic random number sequence Sd, and update the static random number pool 11 according to the subsequent true random number sequence Strn.

The details of the method 500 have been provided in the preceding paragraphs, and will not be repeated here. The method 500 employs in the initialization phase the fixed set of truly random numbers in the initial random number pool 10 to generate the initial true random number sequence Strn and to initiate the static random number pool 11 with the initial true random number sequence Strn. Later in the operation phase, the method 500 employs the static random number pool 11 to output the output random number Srno while updating the static random number pool 11 in a constant manner, saving random number resources while ensuring data security.

Figure 6:
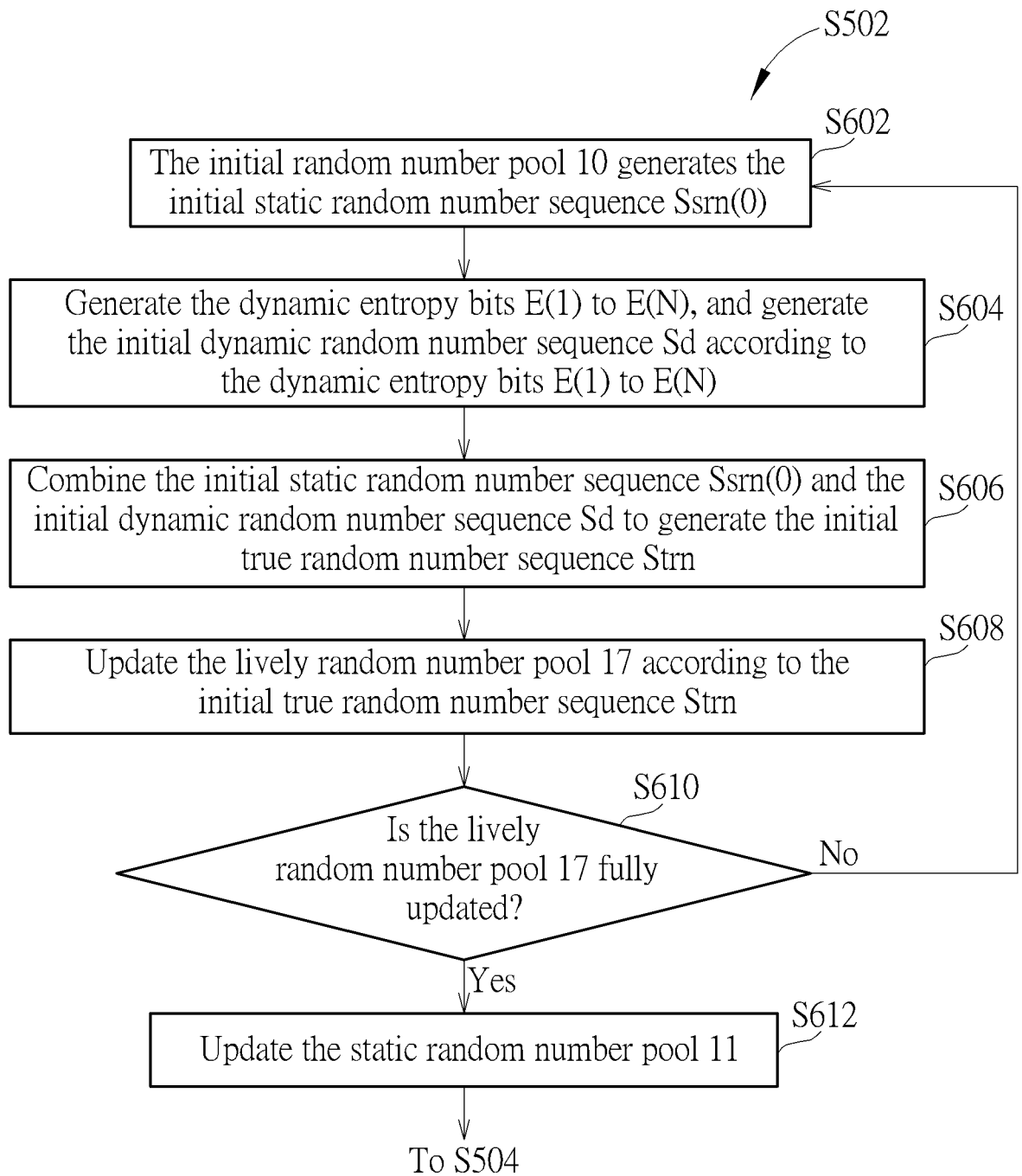
FIG. 6 is a flowchart of a method for implementing Step S502 in FIG. 5.

FIG. 6 is a flowchart of a method for implementing Step S502 in FIG. 5. The method includes Steps S602 to S612 for initiating the static random number pool 11 using the fixed set of truly random numbers in the initial random number pool 10. Any reasonable step change or adjustment is within the scope of the disclosure. Steps S602 to S612 are explained as follows:

Step S602: The initial random number pool 10 generates the initial static random number sequence Ssrn(0);

Step S604: Generate the dynamic entropy bits E(1) to E(N), and generate the initial dynamic random number sequence Sd according to the dynamic entropy bits E(1) to E(N);

Step S606: Combine the initial static random number sequence Ssrn(0) and the initial dynamic random number sequence Sd to generate the initial true random number sequence Strn;

Step S608: Update the lively random number pool 17 according to the initial true random number sequence Strn;

Step S610: Is the lively random number pool 17 fully updated? If so, go to Step S612; if not, go to Step S602;

Step S612: Update the static random number pool 11; go to Step S504.

The details of the method have been provided in the preceding paragraphs, and will not be repeated here. The method employs the fixed set of truly random numbers in the initial random number pool 10 to generate the initial true random number sequence Strn to update the static random number pool 11. Therefore, devices employing the method may derive unique sets of truly random numbers from the fixed set of truly random numbers in the initial random number pool 10, saving resources while ensuring data security.

Figure 7:
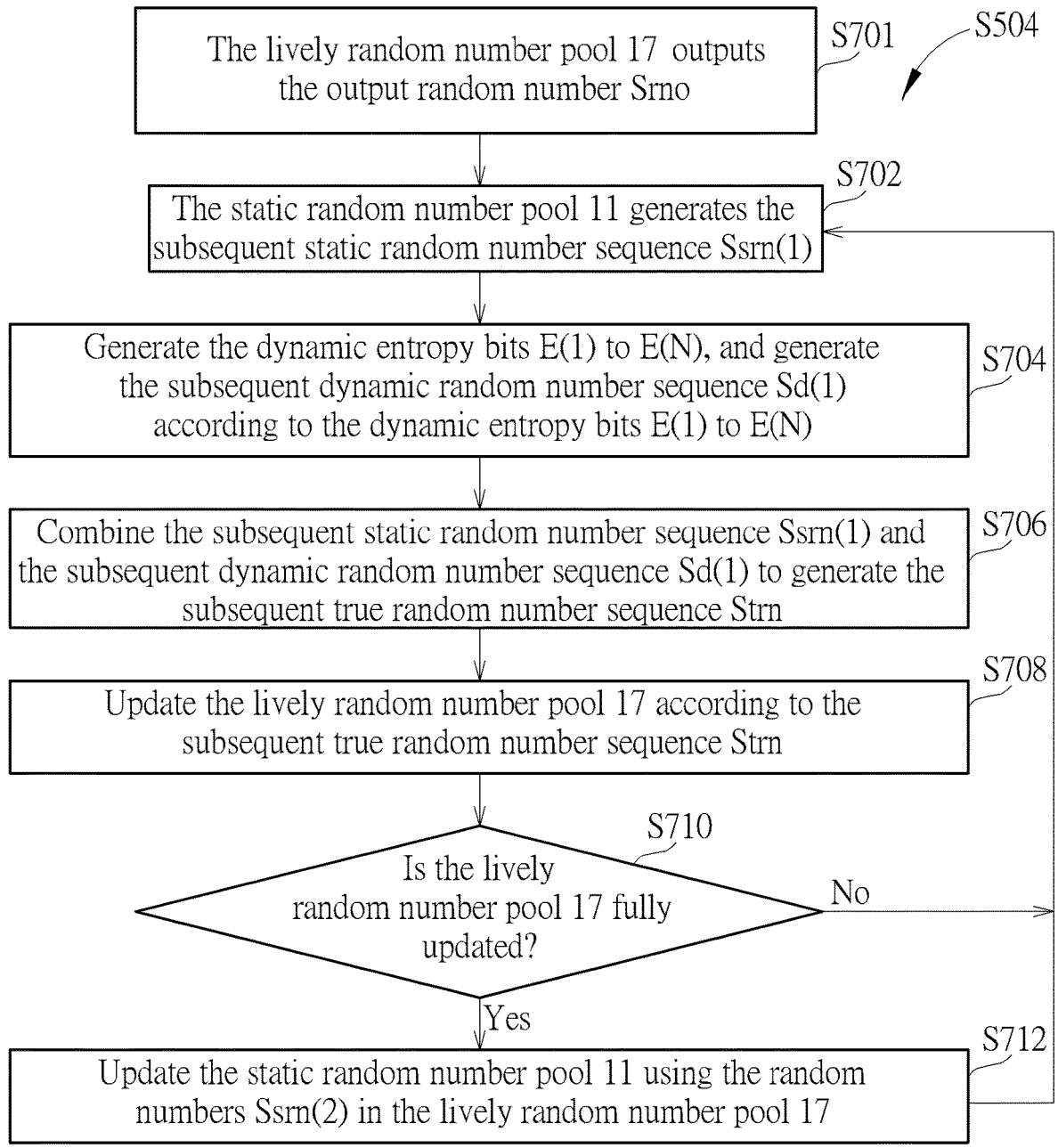
FIG. 7 is a flowchart of a method for implementing Step S504 in FIG. 5.

FIG. 7 is a flowchart of a method for implementing Step S504 in FIG. 5. The method includes Steps S701 to S712 for updating the static random number pool 11 in a continuous and iterative fashion and outputting the output random number Srno from the lively random number pool 17. Step S701 is used to output the output random number Srno. Steps S702 to S710 are used to generate anew set of truly random numbers based on a previous set of truly random numbers. Step S712 is used to update the new set of truly random numbers into the lively random number pool 17. Any reasonable step change or adjustment is within the scope of the disclosure. Steps S701 to S712 are explained as follows:

Step S701: The lively random number pool 17 outputs the output random number Srno;

Step S702: The static random number pool 11 generates the subsequent static random number sequence Ssrn(1);

Step S704: Generate the dynamic entropy bits E(1) to E(N), and generate the subsequent dynamic random number sequence Sd according to the dynamic entropy bits E(1) to E(N);

Step S706: Combine the subsequent static random number sequence Ssrn(1) and the subsequent dynamic random number sequence Sd to generate the subsequent true random number sequence Strn;

Step S708: Update the lively random number pool 17 according to the subsequent true random number sequence Strn;

Step S710: Is the lively random number pool 17 fully updated? If so, go to Step S712; if not, go to Step S702;

Step S712: Update the static random number pool 11 using the random numbers in the lively random number pool 17; go to Step S702.

The details of the method have been provided in the preceding paragraphs, and will not be repeated here. The method updates the static random number pool 11 continuously and iteratively using the previous set of truly random numbers from the static random number pool 11, outputting the output random number Srno from the lively random number pool 17 that is regularly changing, saving resources while further enhancing data security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A random number generator, comprising:
   a static random number generator comprising an initial random number pool and a static random number pool, and configured to output a static random number sequence from the initial random number pool during an initialization phase and from the static random number pool during an operation phase;
   at least one dynamic entropy source configured to generate a dynamic entropy bit;
   a counter coupled to the at least one dynamic entropy source and configured to generate a dynamic random number sequence according to the dynamic entropy bit; and
   a combining circuit coupled to the static random number generator and the counter, and configured to receive the static random number sequence, and output a true random number sequence to a lively random number pool according to the static random number sequence and the dynamic random number sequence;
   wherein the static random number pool is configured to be updated when the lively random number pool is fully updated; and
   the initial random number pool is configured to contain truly random entropy bits.

2. The random number generator of claim 1, wherein the static random number generator further comprises a multiplexer coupled to the initial random number pool and the static random number pool, and configured to select one of an initial static random number sequence from the initial static random number pool and a subsequent static random number sequence from the static random number pool as the static random number sequence.

3. The random number generator of claim 1, further comprising:
   an update circuit coupled to the static random number pool and the lively random number pool, and configured to apply a compression and a nonlinear function to random numbers from the lively random number pool to generate updated true random numbers when the lively random number pool is fully updated, and update the updated true random numbers into the static random number pool.

4. The random number generator of claim 1, wherein the counter comprises:
   a conditional feedback circuit coupled to the at least one dynamic entropy source and the combining circuit, and configured to generate a reseeding control bit according to the dynamic entropy bit and a predetermined bit in the true random number sequence; and
   a linear feedback shift register coupled between the conditional feedback circuit and the combining circuit, and configured to be reseeded according to the reseeding control bit.

5. The random number generator of claim 4, wherein the conditional feedback circuit is configured to generate the reseeding control bit upon each clock cycle.

6. The random number generator of claim 1, further comprising:
   a compression circuit coupled between the combining circuit and the lively random number pool, and configured to compress the true random number sequence into a compressed true random number sequence;
   wherein the lively random number pool is updated with the compressed true random number sequence.

7. The random number generator of claim 1, wherein:
   the lively random number pool is updated with the true random number sequence.

8. The random number generator of claim 1, wherein:
   the lively random number pool is fully updated when a quantity of random numbers updated in the lively random number pool reaches a target quantity.

9. The random number generator of claim 1, wherein:
   the lively random number pool is fully updated when a time period of updating the lively random number pool reaches a target time period.

10. The random number generator of claim 1, further comprising a non-volatile memory configured to store random numbers updated in the static random number pool.

11. The random number generator of claim 1, wherein the initial random number pool is a physically unclonable function (PUF) cell array or a pool with independent and identically distributed random variables (IID).

12. A method of generating an output random number, comprising:
   during an initialization phase, generating an initial static random number sequence from an initial random number pool, generating an initial true random number sequence according to the initial static random number sequence and an initial dynamic random number sequence, and initiating a static random number pool according to the initial true random number sequence, wherein the initial random number pool is configured to contain truly random entropy bits; and
   during an operation phase, outputting the output random number, generating a subsequent static random number sequence from the static random number pool, generating a subsequent true random number sequence according to the subsequent static random number sequence and a subsequent dynamic random number sequence, and updating the static random number pool according to the subsequent true random number sequence.

13. The method of claim 12, wherein:
during the initialization phase, initiating the static random number pool according to the initial true random number sequence comprises:
   updating a lively random number pool according to the initial true random number sequence; and
   updating the static random number pool when the lively random number pool is fully updated;
during the operation phase, outputting the output random number comprises:
   outputting the output random number from the lively random number pool; and
during the operation phase, updating the static random number pool according to the subsequent true random number sequence comprises:
   updating the lively random number pool according to the subsequent true random number sequence; and
   updating the static random number pool when the lively random number pool is fully updated.

14. The method of claim 13, wherein updating the static random number pool when the lively random number pool is fully updated comprises:
   when the lively random number pool is fully updated, an update circuit applying a compression and a nonlinear function to random numbers from the lively random number pool to generate updated true random numbers, and the update circuit updating the updated true random numbers into the static random number pool.

15. The method of claim 13, further comprising:
a compression circuit compressing the initial true random number sequence into a compressed true random number sequence;
wherein updating the lively random number pool according to the initial true random number sequence comprises:
   updating the lively random number pool with the compressed true random number sequence.

16. The method of claim 13, wherein updating the lively random number pool according to the initial true random number sequence comprises:
   updating the lively random number pool with the initial true random number sequence.

17. The method of claim 13, wherein:
the lively random number pool is fully updated when a quantity of random numbers updated in the lively random number pool reaches a target quantity.

18. The method of claim 13, wherein:
the lively random number pool is fully updated when a time period of updating the lively random number pool reaches a target time period.

19. The method of claim 12, further comprising:
storing random numbers from the static random number pool in a non-volatile memory.

20. The method of claim 12, further comprises:
a conditional feedback circuit generating a reseeding control bit according to the dynamic entropy bit and a predetermined bit in the subsequent true random number sequence;
during the initialization phase, reseeding a linear feedback shift register according to the reseeding control bit to generate the initial dynamic random number sequence; and
during the operation phase, reseeding the linear feedback shift register according to the reseeding control bit to generate the subsequent dynamic random number sequence.

* * * * *